(12) United States Patent
Lange (10) Patent No.: US 6,424,295 B1
(45) Date of Patent: Jul. 23, 2002

(54) GPS WEATHER DATA RECORDING SYSTEM FOR USE WITH THE APPLICATIONS OF CHEMICALS TO AGRICULTURAL FIELDS

(75) Inventor: Arthur Lange, Sunnyvale, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 09/510,119

(22) Filed: Feb. 22, 2000

(51) Int. Cl.$^7$ .............................................. H04B 7/185
(52) U.S. Cl. ........................... 342/357.13; 342/357.06; 342/26; 701/213
(58) Field of Search ....................... 342/357.13, 357.03, 342/357.06, 357.12, 357.17, 26; 701/213, 215, 224; 239/14.1, 2.1; 434/217; 702/1, 3

(56) References Cited

U.S. PATENT DOCUMENTS

| | | | |
|---|---|---|---|
| 5,419,493 A | * | 5/1995 | Redway ....................... 239/172 |
| 6,018,907 A | * | 2/2000 | Roehrick ....................... 47/1.7 |
| 6,087,984 A | * | 7/2000 | Keller et al. ........... 342/357.17 |
| 6,199,000 B1 | * | 3/2001 | Keller et al. .................. 701/50 |

* cited by examiner

Primary Examiner—Yonel Beaulieu
(74) Attorney, Agent, or Firm—Wagner Murabito & Hao LLP (57) ABSTRACT

A GPS weather data recording system for use with the dispensing of chemicals to agriculture fields. A GPS receiver is used to determine a series of positions of a vehicle and the velocity of the vehicle as the vehicle traverses an agricultural field. The series of positions and velocity trace the vehicle's ground track across the agricultural field. A wind sensor is used to measure wind velocity with respect to the vehicle. A data storage system is used for storing data measurements, such as the series of positions from the GPS receiver and a series of corresponding wind measurements from the wind sensor. A computer system is coupled to the data storage system. The computer system receives the series of vehicle positions and velocity from the GPS receiver and receives wind velocity measurements from the wind sensor. The computer system is configured to store the series of positions and the corresponding series of wind velocity measurements into the data storage system such that a record of the true wind velocity with respect to the vehicle position is created. The record can be referenced with respect to time to show the vehicle's position on the field at a given time and the true wind velocity computations corresponding to that position and time.

28 Claims, 8 Drawing Sheets

GPS WEATHER DATA RECORDING SYSTEM FOR USE WITH THE APPLICATIONS OF CHEMICALS TO AGRICULTURAL FIELDS

TECHNICAL FIELD

The present invention relates generally to the dispensing of chemicals to agricultural fields. More specifically, the present invention pertains to a high accuracy GPS (Global Positioning System) based method and system for recording weather conditions as agricultural chemicals are dispensed to an agricultural field.

BACKGROUND ART

Crop-dusting is the term generally used for the dispensing of chemicals (e.g., fertilizers, pesticides, and the like) to an agricultural field (e.g., field crops, orchards, etc.) from a dispensing vehicle. During crop-dusting, the dispensing vehicle (e.g., tractor) makes numerous sequential, adjacent passes, dispensing chemicals in a swath across the field in each pass. The tractor's driver carefully follows a ground track which ensures that each successive swath over the field is correctly spaced, distance wise, from the previous swath in order to avoid gaps or overlaps in coverage. For example, should one swath occur too far from a previous swath, the area of the field will not receive an sufficient amount of chemicals (e.g., pesticides, fertilizer, herbicides, and the like). Similarly, should one swath occur too close to a previous swath, the overlap area receives excessive amounts of chemicals. This can prove very expensive to the farmer. The crops of the field can be damaged or rendered unusable.

Certain types of agricultural chemicals needed to be closely tracked in order to ensure they are not inadvertently applied to neighboring fields. For example, while a particular agricultural chemical is selected specifically for application to the "targeted" field, the inadvertent application of this chemical to a neighboring field can be highly undesirable. For example, the application of an herbicide to a crop that is specifically prepared for the herbicide is beneficial for the owner of the crop, while an inadvertent application of the herbicide to a neighboring crop that is not prepared for the herbicide is harmful to the neighboring crop. Hence, it becomes essential that the application of the agricultural chemical (e.g., the herbicide) is precisely controlled and precisely tracked.

Additionally, unusual types of field geometry (e.g., rectangular, circular, irregular, etc.) can make precise control of the chemical application operations more difficult. While conventional, rectangular, agriculture fields, having neatly ordered rows of crops laid out in a rectangular pattern, readily lend themselves to the orderly, rank and file, back and forth maneuvers of a crop-dusting tractor, circular/irregular types of fields are more difficult to ensure regular, even coverage.

Regardless of the field geometry, the presence of wind makes the chemical application operation much more difficult to control and track. The geometry of the agricultural field is constant, while the wind conditions during the application can be highly variable. Accordingly, the position of the dispensing vehicle needs to be closely tracked along with the wind conditions as the vehicle traverses the field.

Figure 1:
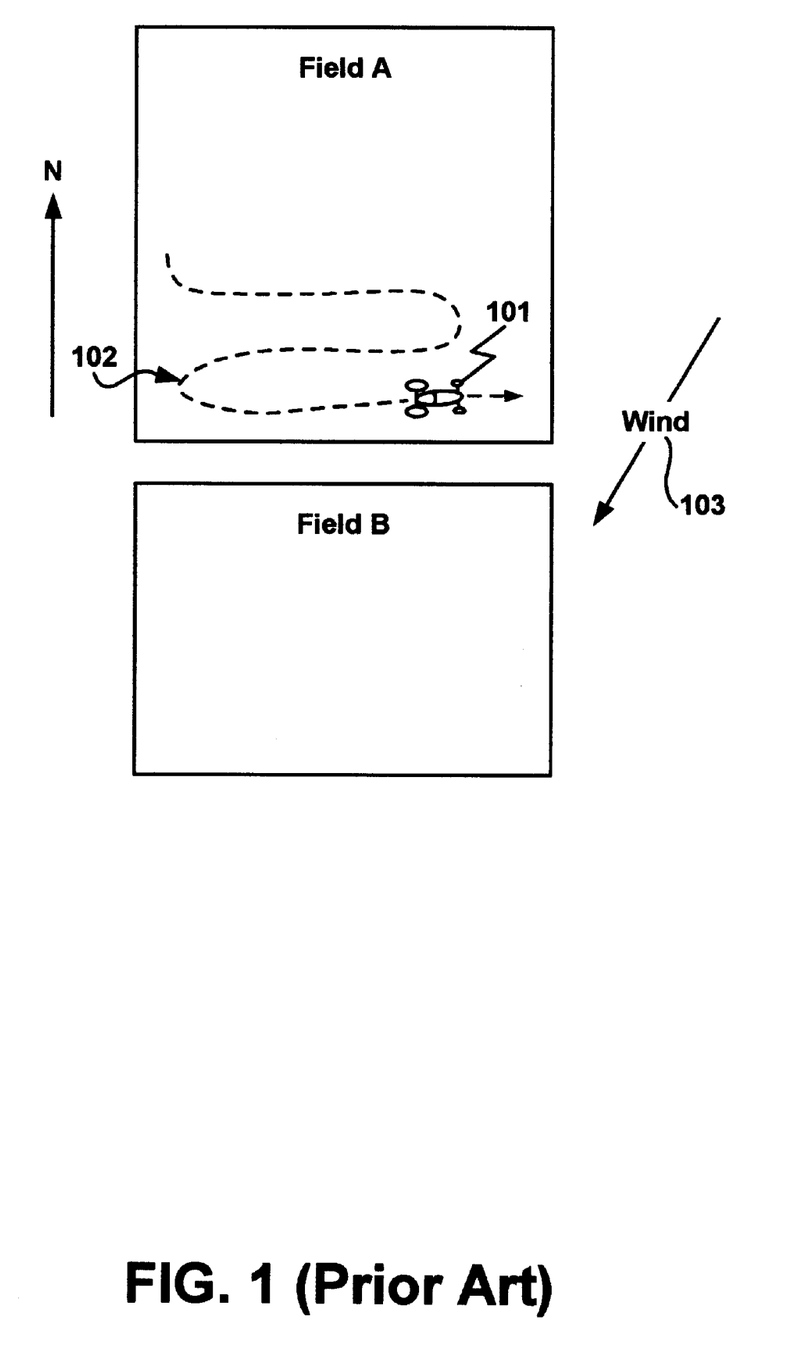

Prior art FIG. 1 shows a diagram of a vehicle 101 dispensing chemicals across a first field (field A), which is adjacent to a second field (field B). As depicted in FIG. 1, the vehicle 101 traverses field A in an orderly, rank and file manner, as shown by ground track 102, dispensing chemicals as the vehicle proceeds. However the vehicle operator needs to exercise care as vehicle 101 approaches the southern boundary of field A. FIG. 1 shows a wind 103 blowing from the Northeast. Thus, as vehicle 101 traverses the southern boundary of field A, wind 103 greatly increases the likelihood that some portion of the chemical spray from vehicle 101 will be blown onto field B which lies immediately to the South. Accordingly, as shown in FIG. 1, that only must the ground track of vehicle 101 be closely monitored, the instantaneous wind velocity must also be monitored to ensure agricultural chemicals are not inadvertently dispensed onto the neighboring field B. This problem is made more difficult by the fact that the wind observed by the operator of the vehicle 101 is typically different from the true when due to the vehicle's forward velocity.

Figure 2:
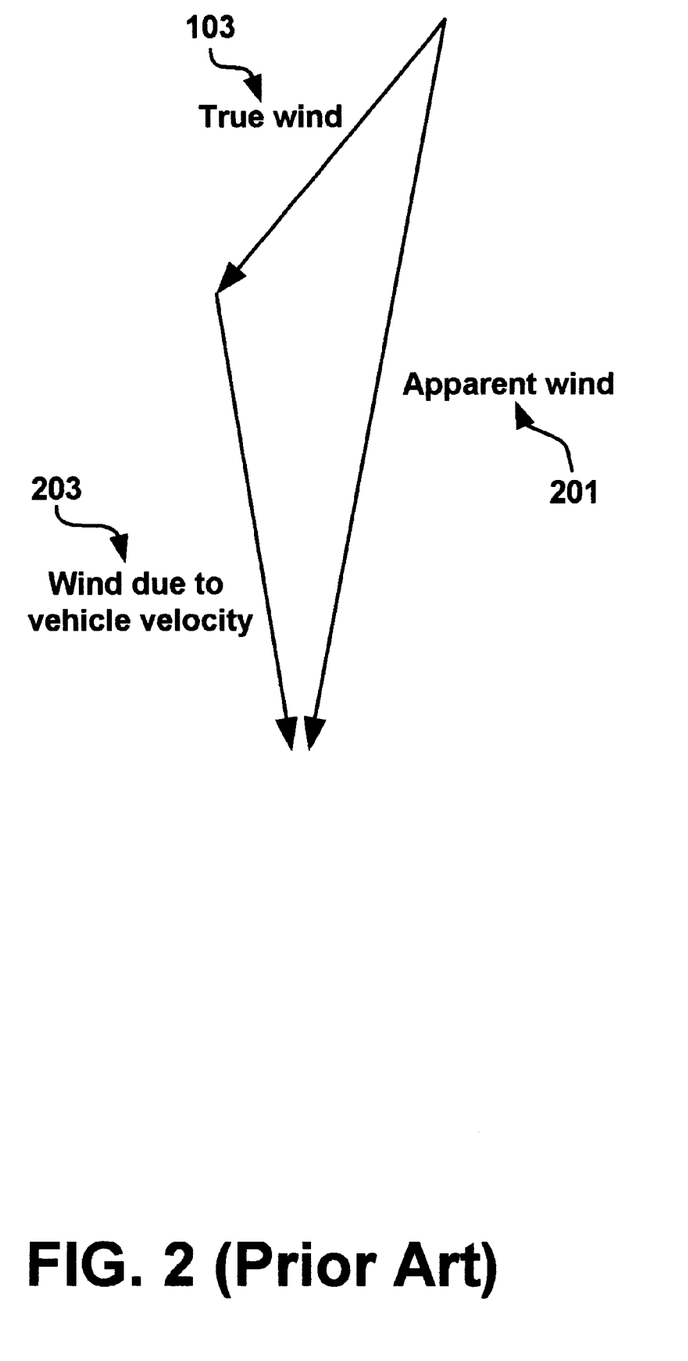

Prior art FIG. 2 shows a diagram depicting the difference between the apparent wind 201 observed by the operator of vehicle 101 and the true wind 103. As described above, the problem of monitoring the true wind 103 to ascertain the location of the dispersion of the chemicals from vehicle 101 is made more difficult by the fact that the driver of vehicle 101 observes an apparent wind 201 due to the vehicle's forward velocity. This is graphically depicted in FIG. 2, which shows the apparent wind vector 201 being comprised of a true wind vector 103 and a wind due to the vehicle velocity 203.

Hence, the driver of tractor 101 is incapable of accurately assessing the true wind 103 based upon observations made from tractor 101 as it traverses the field. This makes the dispensing of agricultural chemicals along boundaries between fields extremely hazardous. Although measurements of wind direction can be made prior to the actual dispensing operation, as is known, wind velocity can be highly variable. Wind conditions at the commencement of dispensing operations can be very different from wind conditions halfway through or near the end of dispensing operations.

Additionally, even in a case where the driver of tractor 101 accurately assesses wind conditions during dispensed operations, and dispenses agricultural chemicals in such a manner that no chemicals are inadvertently dispensed onto the adjacent field, the driver may still be liable at some later date for damage to the adjacent field. This is due to the fact that there exists no reliable means of accurately tracking wind conditions with respect to the vehicle's location as the chemicals were being dispensed. Hence, the driver of tractor 101 is often unable to positively prove the prior dispensing operations are not responsible to any present damage to the adjacent field. In other words, the driver of tractor 101 is unable to positively prove he did not harm his neighbors field.

Thus what is required is a solution which accurately tracks wind conditions with respect to vehicle position. What is further required is a solution which accurately records field position during dispensed operations and the corresponding weather conditions which affect the dispersion of the chemicals dispensed. The record should be easily accessible with respect to time and position. In addition, what is further required is a solution which provides visual feedback with respect to the dispersal of chemicals and with respect to the weather conditions (wind direction, humidity, temperature, etc.). The method and system of present invention provide a novel solution to the above requirements.

DISCLOSURE OF THE INVENTION

The present invention provides a solution which accurately tracks wind conditions with respect to vehicle position. The method and system of the present invention accurately records vehicle field position during dispensed operations and the corresponding weather conditions which affect the dispersion of the chemicals dispensed from the vehicle. The method and system of the present attention provides a record that is easily accessible with respect to time and vehicle position. In addition, the present invention provides visual feedback with respect to the dispersal of chemicals and with respect to the weather conditions.

In one embodiment, the system of the present invention is implemented as a GPS weather data recording system for use with the dispensing of chemicals to agriculture fields. In this embodiment, a GPS receiver is used to determine a series of positions of a vehicle and vehicle velocity as the vehicle traverses an agricultural field. The series of positions trace the vehicle's ground track across the agricultural field. A weather sensor (e.g., a wind sensor) is used to measure wind velocity with respect to the vehicle. A data storage system is used for storing data measurements, such as the series of positions and velocities from the GPS receiver and a series of corresponding wind measurements from the wind sensor. A computer system is coupled to the data storage system. The computer system receives the series of positions and velocities from the GPS receiver and the wind measurements from the wind sensor and is configured to compute a corresponding series of true wind velocities. This data is then stored with the series of positions into the data storage system such that a record of the true wind velocity with respect to the vehicle position is created.

The record can be referenced with respect to time to show the vehicle's position on the field at a given time and the true wind velocity computations corresponding to that position and time. In this manner, the GPS weather data recording system of the present invention creates an accurate record of the vehicle field position during dispensed operations and the corresponding weather conditions which affected the dispersion of the chemicals dispensed from the vehicle. This allows the vehicle operator to positively to determine exactly where chemicals were dispensed and the weather conditions at the instant of dispensing which affected the dispersal of the chemicals, and thus determine and prove exactly where the agricultural chemicals landed.

BRIEF DESCRIPTION OF THE DRAWINGS

The accompanying drawings, which are incorporated in and form a part of this specification, illustrate embodiments of the invention and, together with the description, serve to explain the principles of the invention:

Prior art FIG. 1 shows a diagram of a vehicle dispensing chemicals across a first field, wherein the first field is immediately adjacent to a second field.

Prior art FIG. 2 shows a diagram depicting the difference between the apparent wind observed by the operator of a vehicle and the true wind.

FIG. 3 shows a diagram of a GPS weather data recording system in accordance with one embodiment of the present invention.

FIG. 4A shows a diagram of a GPS receiver in accordance with one embodiment of the present invention.

FIG. 4B shows a diagram of an embedded computer included in a GPS receiver in accordance with one embodiment of the present invention.

FIG. 5 shows a GPS weather data recording system in accordance with an alternative embodiment of the present invention.

FIG. 6 shows a diagram of a display of a GPS weather data recording system in accordance with one embodiment of the present invention.

FIG. 7 shows a flow chart of the steps of a GPS weather data recording process in accordance with one embodiment of the present invention.

DETAILED DESCRIPTION OF THE INVENTION

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

The present invention, a GPS weather data recording system for use with the dispensing of chemicals to agriculture fields, provides a solution which accurately tracks wind conditions with respect to vehicle position. The method and system of the present invention accurately records vehicle field position and vehicle velocity during dispense operations and the corresponding weather conditions which affect the dispersion of the chemicals dispensed from the vehicle. The method and system of the present attention provides a record that is easily accessible with respect to time and vehicle position. In addition, the present invention provides visual feedback with respect to the dispersal of chemicals and with respect to the weather conditions. The present invention and its benefits are further described below.

NOTATION AND NOMENCLATURE

Some portions of the detailed descriptions which follow are presented in terms of procedures, steps, logic blocks, processing, and other symbolic representations of operations on data bits within a computer memory. These descriptions and representations are the means used by those skilled in the data processing arts to convey most effectively the substance of their work to others skilled in the art. A procedure, computer executed step, logic block, process, etc., are here, and generally, conceived to be self-consistent sequences of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing," "computing," "translating," "instantiating," "determining," "displaying," "recognizing," or the like, refer to the action and processes of a computer system, or similar electronic computing device, that manipulates and transforms data represented as physical (electronic) quantities within the computer system's registers and memories into other data similarly represented as physical quantities within the computer system registers or memories or other such information storage, transmission, or display devices.

COMPUTER SYSTEM ENVIRONMENT

Figure 4A:
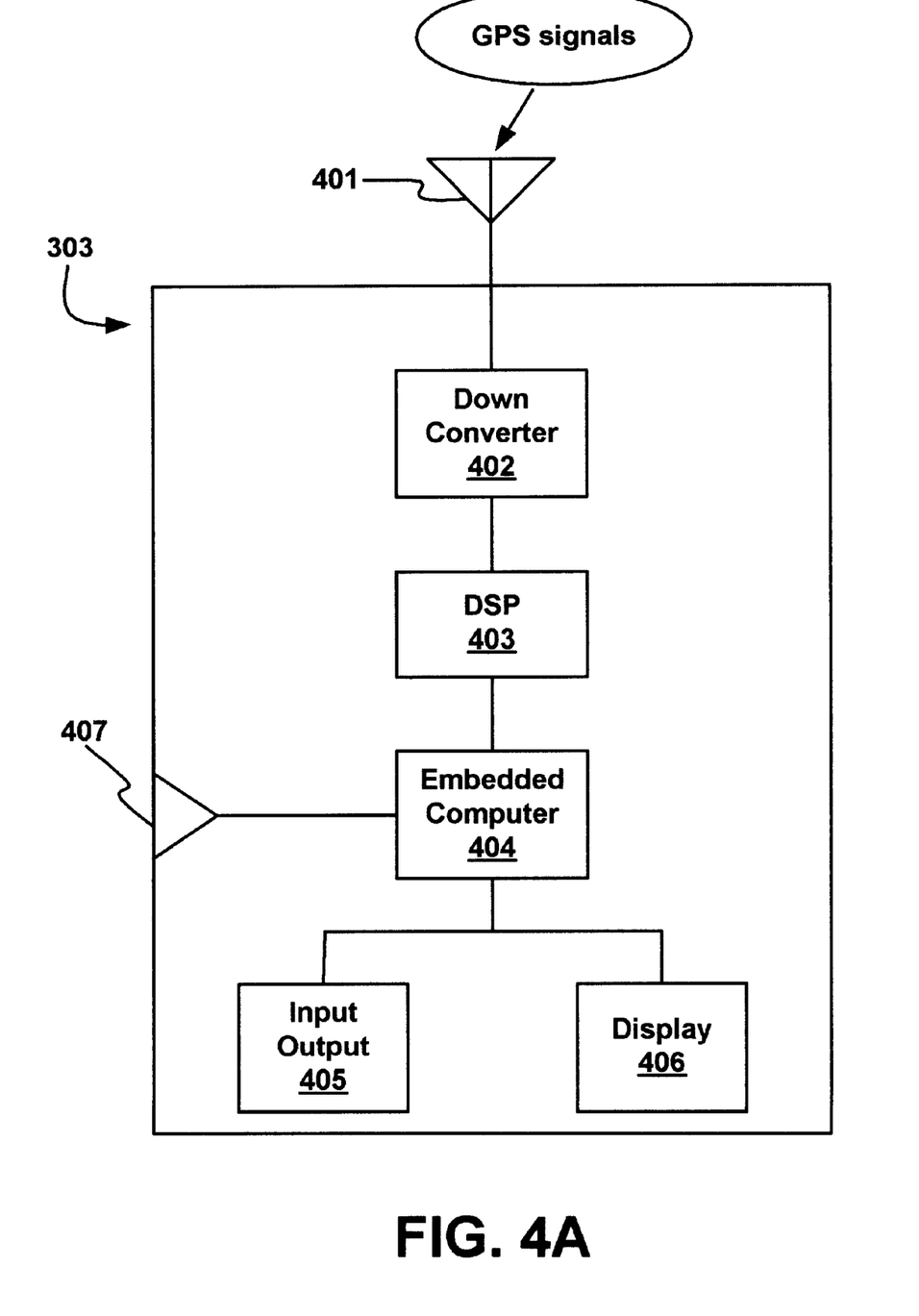
Figure 4B:
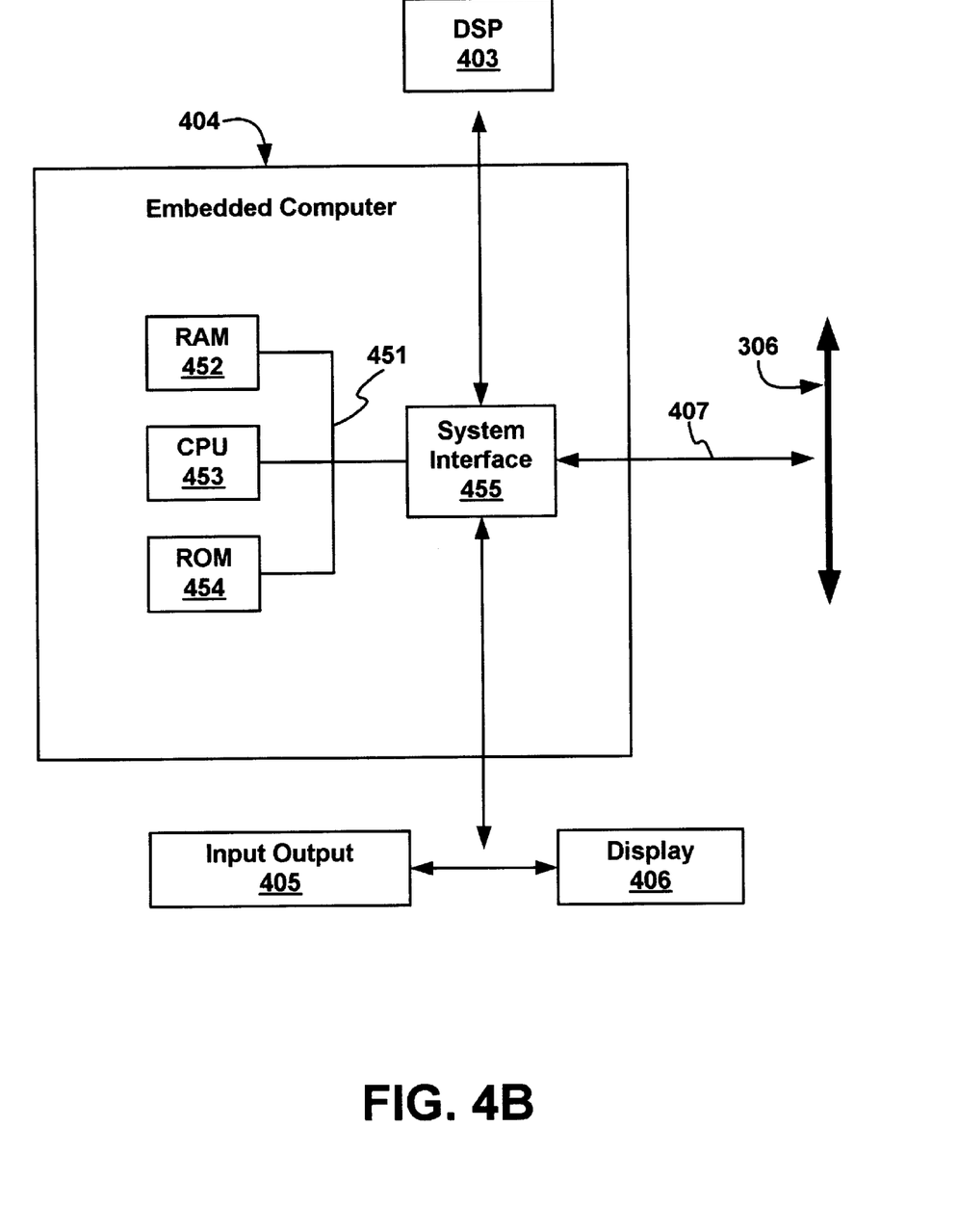

Within the following discussions of the present invention, certain processes and steps are discussed that are realized, in one embodiment, as a series of instructions (e.g., software program) that reside within computer readable memory units of system 404 and executed by processors of system 404 (shown in FIG. 4B). When executed, the instructions cause the computer system 404 to perform specific actions and exhibit specific behavior which is described in detail as follows.

In general, computer system 404 used by the present invention comprises an address/data bus 451 for communicating information, one or more central processors for 53 coupled with bus 451 for processing information and instructions, a computer readable volatile memory unit 452 (e.g., random access memory, static RAM, dynamic RAM, etc.) coupled with bus 451 for storing information and instructions for central processor(s) 453, a computer readable non-volatile memory unit (e.g., read only memory, programmable ROM, flash memory, EPROM, EEPROM, etc.) coupled with bus 451 for storing static information and instructions for central processor(s) for 53. System 404 can optionally include a mass storage computer readable data storage device, such as a magnetic or optical disk and disk drive coupled with bus 451, for storing information and instructions. System 404 can also couple to a display 406 for displaying information to the computer user, and an input output device 405 including, for example, alphanumeric and function keys for communicating information and command selections, cursor control inputs, command selections, etc.

As described above, one embodiment of the present invention comprises a GPS weather data recording system for use with the dispensing of chemicals to agriculture fields. Although in the embodiments disclosed herein below, the present invention is described as functioning with a ground vehicle (e.g., a tractor) dispensing chemicals to agricultural fields, it should be appreciated that the present invention is suited to use with various vehicles and various dispensing means, for example, the aerial application of chemicals to agricultural fields using an aircraft (e.g., a helicopter or airplane) having appropriate instrumentation to allow the computation of the true wind velocity (e.g., instruments for measureing crab angle, etc.).

Figure 3:
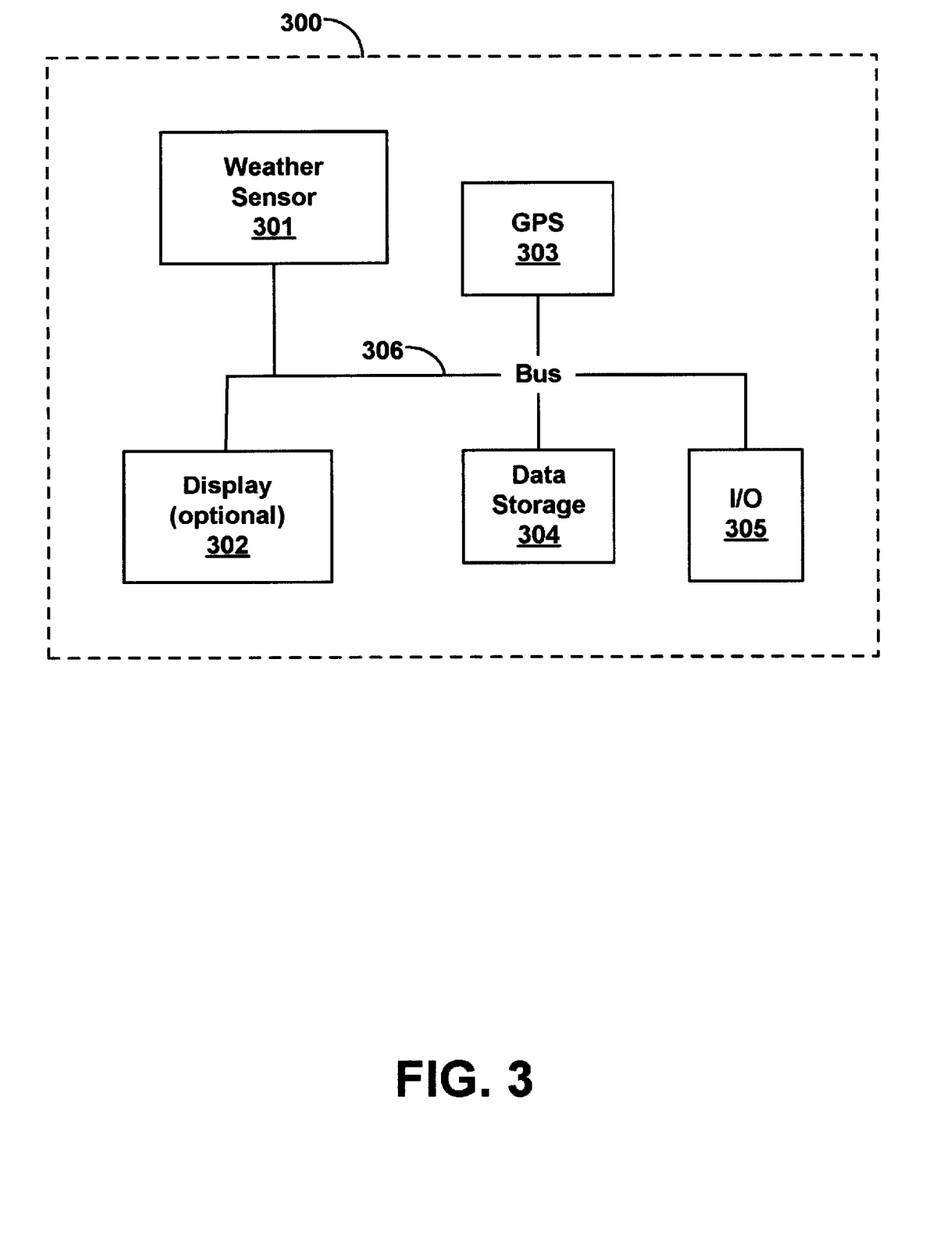

FIG. 3 shows a system 300 in accordance with one embodiment of the present invention. System 300 includes a GPS receiver (or alternatively, a differential GPS receiver) 303, a data storage unit 304, a display 302, and an input output unit (I/O) 305, each coupled to a bus 306. A weather sensor 301 is also coupled to bus 306. In this embodiment, the display 302 is an optional component included to provide visual feedback to the vehicle operator, such as, for example, vehicle location and ground track, wind velocity, time, and the like. GPS receiver 303 functions by providing vehicle positioning and velocity information and navigation data (e.g., time, velocity, etc.). Weather sensor 301 functions by providing weather information, such as, for example, apparent wind velocity (e.g., wind speed and wind direction), temperature, humidity, barometric pressure, and the like. Data storage unit 304 functions by storing provided information (e.g., present position, time, vehicle velocity, wind velocity, etc.) into a data structure for later retrieval. I/O unit 305 functions by providing access means for external systems to allow data to be retrieved from, for example data storage unit 304, or data to be uploaded into system 300. System 300 is typically carried by or installed on the vehicle which will be performing the chemical application operations.

Referring still to FIG. 3, in the present embodiment, GPS receiver 303 functions by determining a present position, ground track, and ground speed of a vehicle in which system 300 is installed. In this embodiment, GPS receiver 303 contains sufficient computational resources to execute various software routines which implement the functionality of the present invention. Accordingly, GPS receiver 303 provides the computer system platform that executes software routines which implement the functionality for performing the weather data recording processes for use with the dispensing of chemicals to agriculture fields.

System 300 uses a GPS receiver 303 to determine a series of positions of a vehicle as the vehicle traverses an agricultural field and the corresponding vehicle velocity at those positions. The series of positions and velocity measurements trace the vehicle's ground track across the agricultural field. Concurrently, weather sensor 301 is used to measure wind velocity with respect to the vehicle, and other weather data which affects the dispersal of the agricultural chemicals. Data storage unit 304 is used for storing the resulting data measurements, such as the series of positions from the GPS receiver and a series of corresponding wind measurements from the wind sensor. As described above, GPS receiver 303 provides the computer system platform for implementing functionality of system 300. The embedded computer system of GPS receiver 303 receives the series of positions and velocities from the GPS receiver 303 and receives weather measurements (e.g., wind velocity measurements, etc.) from the weather sensor 301 and is configured to determine wind velocity and store a series of positions and a corresponding series of weather measurements (e.g., temperature, humidity, etc.) into the data storage unit 304 such that a record of the weather measurements with respect to the vehicle position is created.

The record can be referenced with respect to time to show the vehicle's position and velocity on the field at a given time and the weather measurements corresponding to that position and time. In this manner, the GPS weather data recording system 300 of the present invention creates an accurate record of the vehicle field position during dispensed operations and the corresponding weather conditions which affected the dispersion of the chemicals dispensed from the vehicle. This allows the vehicle operator to positively to determine exactly where chemicals were dispensed and the weather conditions at the instant of dispensing which affected the dispersal of the chemicals, and thus determine and prove exactly where the agricultural chemicals landed.

An example of a resulting data record as created by system 300 of the present invention is depicted in table 1 below. Table 1 shows three entries of a data record. It should be noted that in a typical use (e.g., the application of chemicals to an entire field), the data record in accordance with the present invention can contain hundreds of thousands of entries. System 300 can be configured to provide, for example, one entry per second, thus creating a very detailed record of the application operation.

TABLE 1

Data Record

| DATA FIELD | entry No. 1 | entry No. 2 | entry No. 3 |
|---|---|---|---|
| Time/date | | | |
| Vehicle position | | | |
| Vehicle velocity | | | |
| Apparent wind velocity | | | |
| Temperature | | | |
| Humidity | | | |
| True wind velocity | | | |
| Chemical applied | | | |
| Flow rate | | | |
| Droplet size | | | |

In the present embodiment, as shown by table 1, weather sensor 301 is capable of taking a variety of weather data measurements (apparent wind velocity, temperature, humidity, barometric pressure, and the like). However, in a basic implementation, weather sensor 301 can be implemented as a wind velocity sensor which merely records wind speed and wind direction, as opposed a range additional weather measurements.

Additionally, in the present embodiment, system 300 is capable of receiving dispense information from, for example, a chemical dispense controller (not shown) mounted on the vehicle. The dispense information can describe, for example, the flow rate of the chemicals being dispensed, dispense pressure, droplet size, spray pattern, and the like. The dispense information is communicated to system 300 via I/O unit 305.

In the present embodiment, the data record created by system 300 is retrieved via I/O unit 305. The retrieval operation can be implemented by, for example, downloading the data record onto removable media (e.g., floppy disk, etc.) via I/O unit 305 and simply removing the removable media from system 300. Alternatively, for example, the data record can be retrieved wirelessly, by transmitting the data record via I/O unit 305 using a coupled RF data transmitter (e.g., cellular, etc.), or by plugging in an access line into inappropriate connection point (e.g., serial bus port, parallel port, USB port, etc.). With each of the above methods of retrieving the data record, a "hard copy" version of the data record can be printed (e.g., using an appropriately configured printer) to allow, for example, more conventional methods of archival for later reference (e.g., filing, memorandizing, etc.), or to facilitate the sharing of the information with other users (e.g., distributing the printed hard copy using a mailing list, etc.).

Referring now to FIG. 4A, a diagram of GPS receiver 303 in accordance with one embodiment of present invention is shown. As is well known by those skilled in the art, GPS receiver 303 is designed to function with GPS satellites of the GPS constellation.

The GPS satellites of the constellation are located in six orbital planes, four satellites in each plane, having an inclination of 55 degrees relative to the equator and an altitude of approximately 20,200 km (10,900 miles). This positions each of the GPS satellites such that a minimum of five of them are normally observable (above the horizon) by a user anywhere on earth at any given time. The orbiting GPS satellites each broadcasts spread-spectrum microwave signals encoded with positioning data. The signals are broadcast on two frequencies, L1 at 1575.42 MHz and L2 at 1227.60 MHz. Essentially, the signals are broadcast at precisely known times and at precisely known intervals and are encoded with their precise time of transmission. A user receives the signals with a GPS receiver (e.g., GPS receiver 303) designed to determine an exact time of arrival of the signals and to demodulate the satellite orbital data contained therein. Using the orbital data, the GPS receiver 303 determines the time between transmission by the satellite and reception by the receiver and uses this information to determine a pseudo-range measurement of that satellite. By determining the pseudo-ranges of four or more satellites, GPS receiver 303 is able to determine its precise location in three dimensions, velocity, and a time offset which is used to generate a very precise time reference.

GPS receiver 303 receives GPS signals via antenna 401. The GPS signals are down converted, via down converter 402, then de-spread and demodulated by the digital signal processor (DSP) 403, and passed to an internal embedded computer 404, which computes the correct pseudo ranges and determines the GPS-based position and velocity. Information can be communicated to the user via an optional display coupled to the embedded computer and built into GPS receiver 303. In the present embodiment, display 406 and display 302 (of FIG. 3) are both adapted to present position and weather information to the vehicle operator.

The GPS receiver 303 can be configured via an optional user input output 405 (e.g., a keyboard or joystick). Accordingly, GPS receiver 303 can receive navigation information or the like via input output 405 or via I/O component 305 and bus 306 (of FIG. 3). The GPS-based position and other navigation information are communicated to system 300 via communications port 407. Communications port 407 couples GPS receiver 303 to bus 306. Additionally, communications port 407 can be one of many well known interface standards in use in the electronics field (e.g., RS-232, ARINC 429, ARINC 629, Milstd 1553, and the like).

It should be appreciated that GPS receiver 303 can be implemented as a differential GPS receiver (DGPS), which provides greater accuracy. To improve the accuracy of GPS determined PVT, differential GPS systems have been developed and widely deployed. As is well known, differential GPS functions by observing the difference between pseudo range measurements determined from the received GPS signals with the actual range as determined from the known reference station point. The DGPS reference station determines systematic range corrections for all the satellites in view based upon the observed differences. The systematic corrections are subsequently broadcast to interested users having appropriate DGPS receivers. The corrections enable the users to increase the accuracy of their GPS determined position. Differential correction broadcasts are currently in wide use throughout the world. Tens of thousands of DGPS receivers have been built and are in operation.

Alternatively, it should be appreciated that GPS receiver 303 can also be implemented as an RTK (real-time kinematics) GPS receiver. RTK is an even more accurate technique for improving the accuracy of GPS. As is well known, RTK involves the use of two or more GPS receivers which are coupled via a communications link (usually RF based). The GPS receivers are spatially separated and communicate to resolve ambiguities in the carrier phase of the GPS signals transmitted from the GPS satellites. The resulting carrier phase information is used to determine an extremely precise position (e.g., within 2 to 3 centimeters).

Thus, RTK GPS receivers are among the most accurate navigation and surveying instruments available.

FIG. 4B shows a more detailed diagram of embedded computer 404 of FIG. 4A. As described above, GPS receiver 303 includes sufficient computational resources to host software programs which implement many features and functions of the present invention. In the present embodiment, this software is executed on the computer system platform provided by embedded computer 404. The software interacts with the other components of system 300 of FIG. 3 via message passing and communication protocols of port 407 and bus 306. Specifically, it should be appreciated that aspects of the present invention, described herein, are discussed in terms of functions or steps executed on a computer system platform. Although a variety of different computer systems can be used with the present invention, an exemplary general purpose computer system is shown in the embedded computer 404 of FIG. 4B. It should further be appreciated that alternatively, any other one or more components of system 300 (e.g., data storage unit 304) can be configured to include the necessary computational resources and thereby provide a computer system platform for executing the software of the present invention.

With reference still to FIG. 4B, as described above, embedded computer 404 includes an address/data bus 451 for communicating information, one or more central processors (CPUs) 453 coupled with the bus 451 for processing information and instructions, a volatile memory (e.g., random access memory RAM) 452 coupled with the bus 451 for storing information and instructions for the CPU 453, and a non-volatile memory (e.g., read only memory ROM) 454 coupled with the bus 451 for storing static information and instructions for the CPU 453. Also included in the embedded computer 404 is a system interface unit 455 for interfacing bus 451 with bus 306, DSP 403, input-output unit 405, and display 406.

Figure 5:
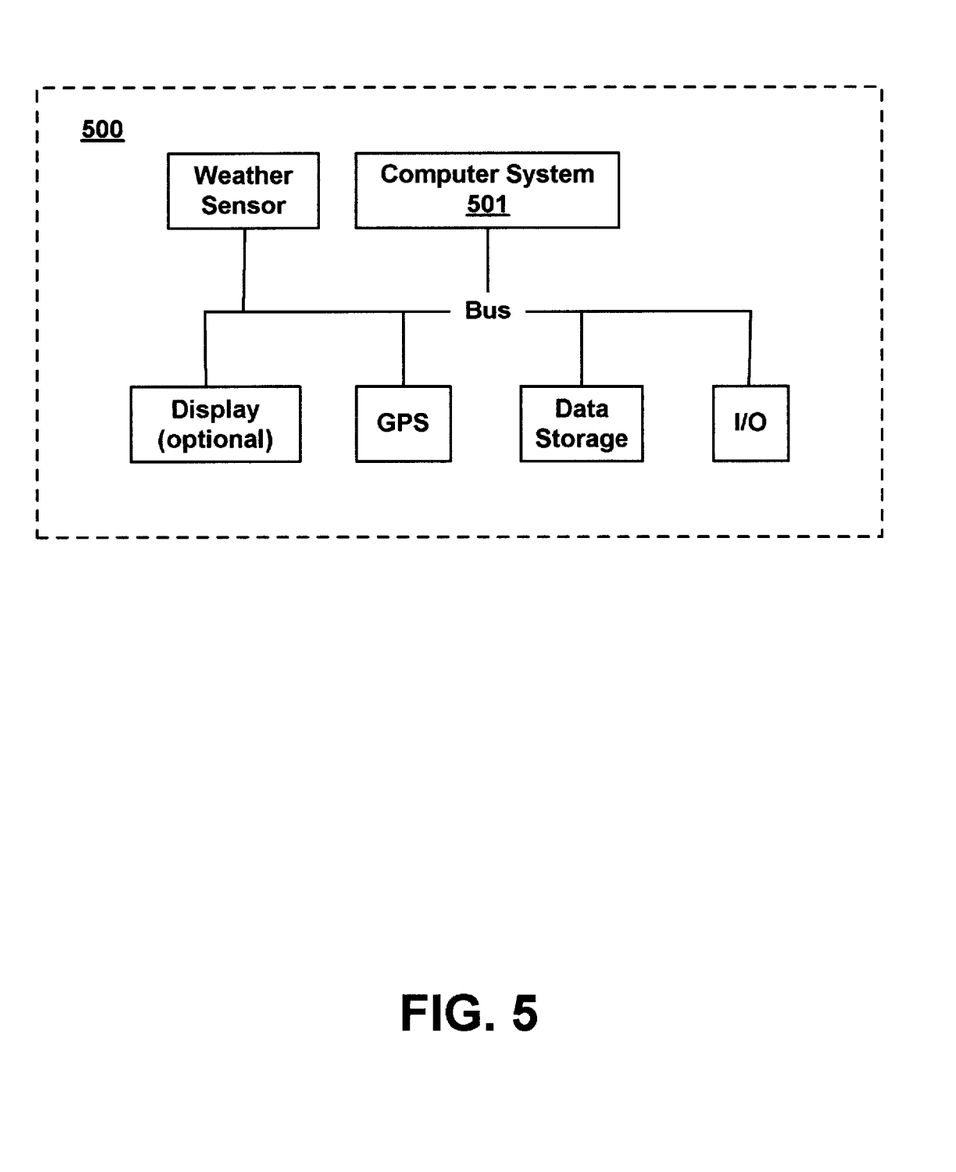

With reference now to FIG. 5, a system 500 in accordance with one alternative embodiment of the present invention is shown. System 500 is substantially the same as system 300 with the exception of a discreet computer system 501. Computer system 501 is included to provide a separate, discreet computer system platform for the software of the present invention. It should be noted that computer system 501 is substantially similar to embedded computer 404 (e.g., having a RAM and ROM coupled to a CPU via a bus). Computer system 501 is, however, a separate component as opposed to being embedded within one of the other components of the system of the present invention.

Figure 6:
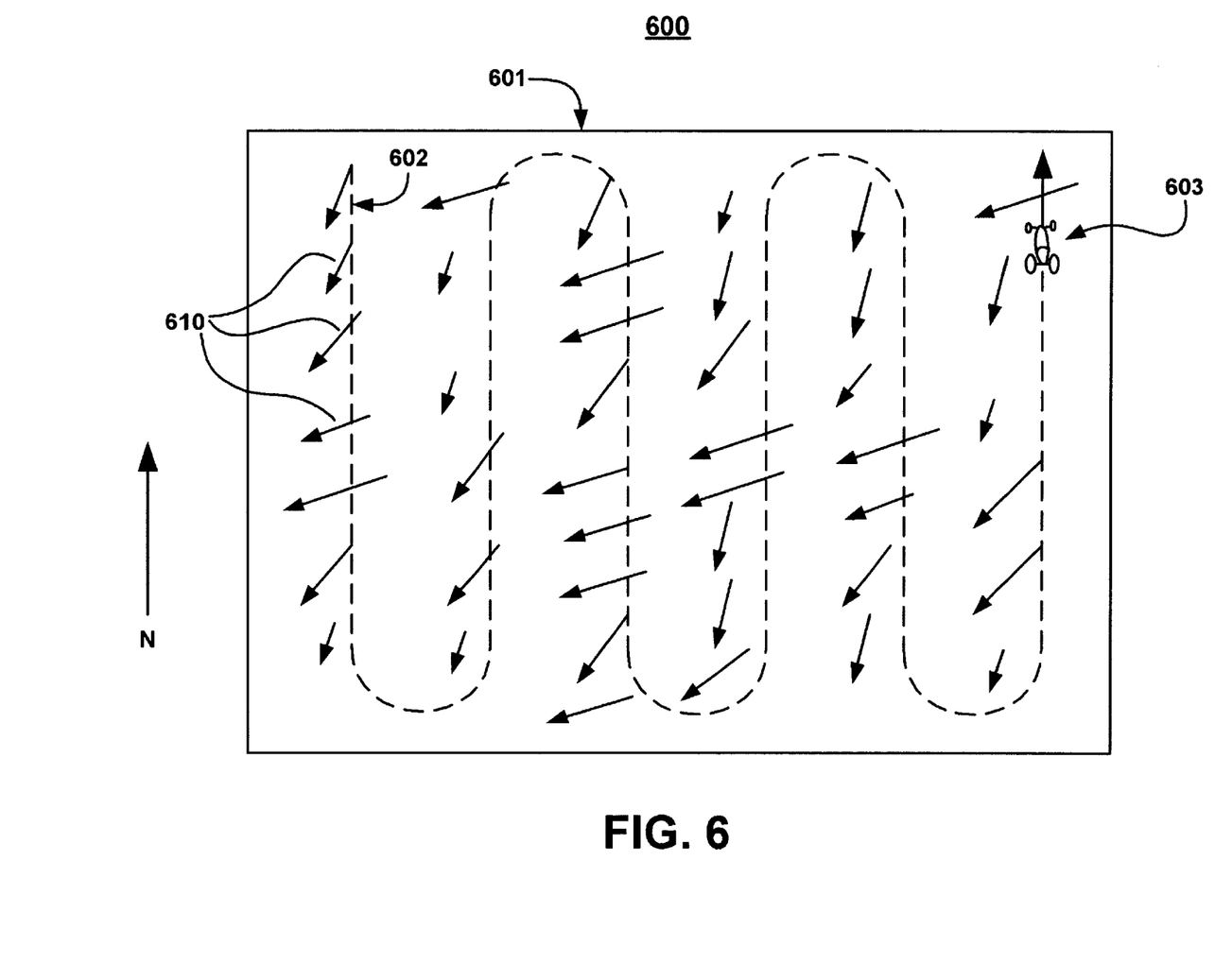

FIG. 6 shows a diagram of a display 600 in accordance with one embodiment of the present invention as shown to the operator of the vehicle (e.g., via the optional display 302). As described above, system 300 of the present invention is able to provide visual feedback to the vehicle operator regarding the weather conditions and the present position of the vehicle has the vehicle traverses the agricultural field. FIG. 6 depicts one embodiment of this display.

The boundaries of the agricultural field are shown by a box 601. A ground track 602 is shown as vehicle 603 traverses field 601. As described above, system 300 takes a series of measurements and records them into a resulting data record. Each of these measurements has at least a vehicle position, a wind velocity, and a time. This is shown as a plurality of arrows 610 spaced along ground track 602. Each arrow represents a wind velocity measurement at that time. Hence, the earliest measurement occurs at the beginning of ground track 602 while the most recent measurement occurs near the end of ground track 602. Each measurement is depicted as a wind velocity vector superimposed on ground track 602. This provides a graphical depiction of the wind conditions at each point along ground track 602. Thus, for example, the operator vehicle 603 has a data record showing the wind conditions as vehicle 603 is closest to the boundaries of field 601. In the present embodiment, a much more detailed version of the data record depicted by display 600 can be retrieved from data storage unit 304.

Figure 7:
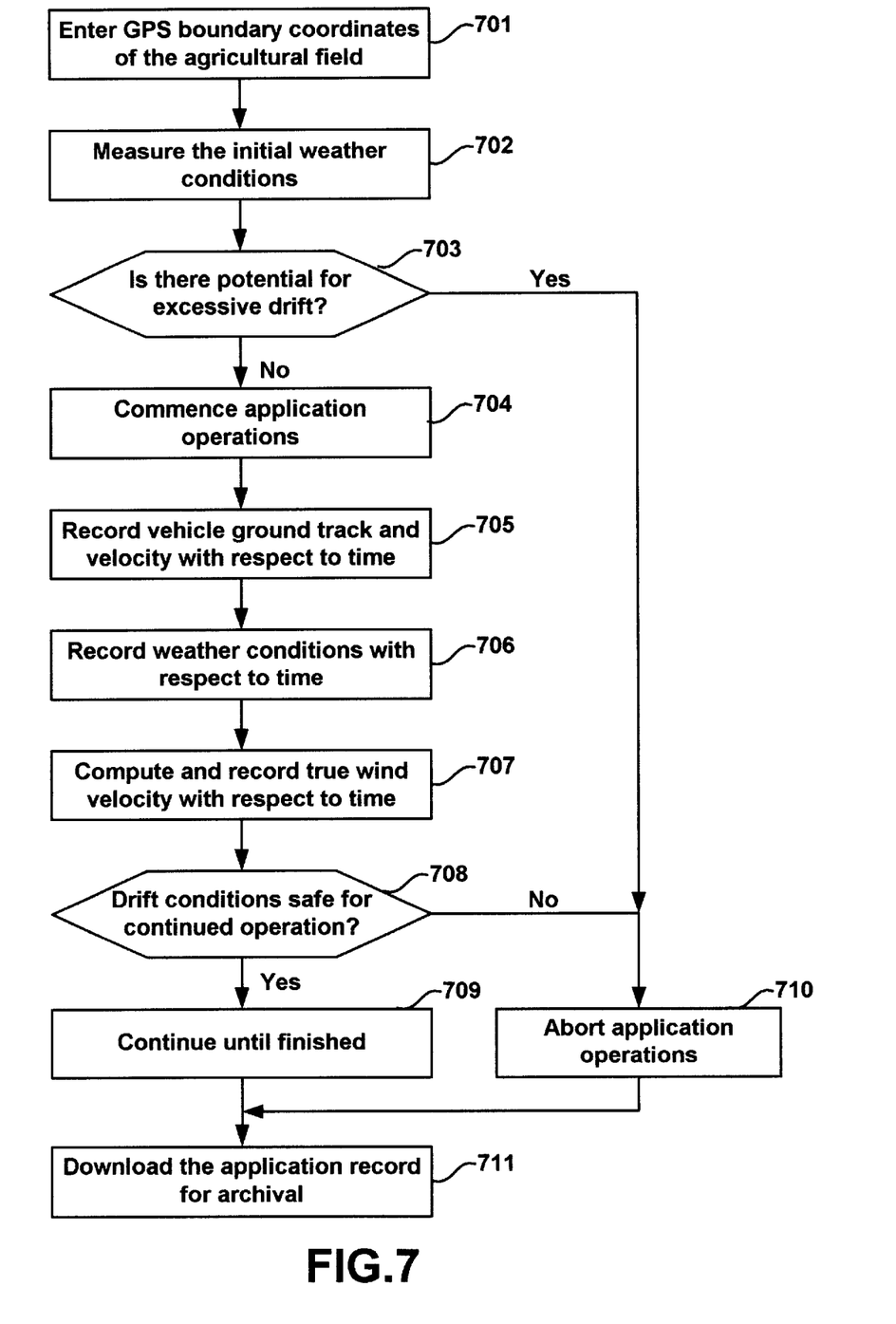

With reference now to FIG. 7, a flow chart of the steps of a process 700 in accordance with one embodiment of the present invention is shown. As depicted in FIG. 7, process 700 shows the operating steps of a GPS weather data recording system (e.g., system 300 of FIG. 3) in accordance with one embodiment of the present invention as the system is used in chemical application operations on an agricultural field.

Process 700 begins in step 701, where GPS boundary coordinates of the agricultural field to which the chemicals are to be applied are entered into the GPS weather data record system (e.g., system 300). The boundary coordinates are used by system 300 track the location of the vehicle (e.g., vehicle 603 of FIG. 6) with respect to the boundaries of the agricultural field (e.g., field 601) and to determine when unsafe drift conditions exist.

In step 702, the initial weather conditions are measured by system 300 in order to begin the data record. As described above, depending upon the particular embodiment, the weather conditions recorded can be simply wind velocity, or can also include temperature, humidity, barometric pressure, etc.

In step 703, based upon the initial vehicle location, the GPS boundary coordinates, and the initial weather conditions, system 300 determines whether there is an excessive potential for unsafe drift. This serves as an initial condition check to determine whether the weather conditions are too unsatisfactory to even commence application operations (at least from the current initial location). Where unsafe drift conditions exist, process 700 proceeds directly to step 709, where the application operations are aborted. Otherwise, process 700 proceeds to step 704.

In step 704, chemical application operations are commenced. Where unsafe drift conditions do not exist based upon the initial weather conditions in the initial vehicle location, system 300 informs the vehicle operator (e.g., via display 302) that it is safe to begin the application operations.

In step 705, the vehicle proceeds to apply chemicals to the agricultural field, following a ground track (e.g., ground track 602 of FIG. 6) recorded by system 300. The GPS determined vehicle velocity is also recorded.

In step 706, as the vehicle proceeds along the ground track, the appropriate weather conditions and the time are recorded.

In step 707, using the vehicle velocity and the measured apparent wind velocity, system 300 computes and records the true wind velocity with respect to time.

In step 708, system 300 continually monitors vehicle location, velocity, and weather conditions (e.g., true wind velocity) as chemical application operations proceed. If drift conditions remain safe for continued operation, process 700 proceeds to step 709, else, process 700 proceeds to step 710 where the application operations are aborted.

In step 709, where conditions remain safe for continued operation, process 700 continues until the field is finished.

Subsequently, in step 711, the application record/data record compiled by system 300 is downloaded for archival by the user. As described above, downloading the record can take several different forms, such as, for example, wireless transmission to a base station, the removal of magnetic storage media, or the like. As shown in process 700, the application record can be downloaded regardless of whether the application operations were completed successfully in step 709 or aborted in step 710.

Thus the present invention provides a GPS weather data recording system for use with the dispensing of chemicals to agriculture fields, thereby providing a solution which accurately tracks wind conditions with respect to vehicle position. The method and system of the present invention accurately records vehicle field position and vehicle velocity during dispense operations and the corresponding weather conditions which affect the dispersion of the chemicals dispensed from the vehicle. The method and system of the present attention provides a record that is easily accessible with respect to time and vehicle position. In addition, the present invention provides visual feedback with respect to the dispersal of chemicals and with respect to the weather conditions.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, thereby to enable others skilled in the art best to utilize the invention and various embodiments with various modifications as are suited to the particular use contemplated. It is intended that the scope of the invention be defined by the Claims appended hereto and their equivalents.

What is claimed is:

1. A GPS weather data recording system for use with the dispensing of chemicals to agriculture fields, comprising:

a GPS receiver adapted to determine a series of positions of a vehicle as the vehicle traverses an agricultural field;

a weather sensor for measuring wind velocity;

a data storage system for storing data measurements; and a computer system coupled to the data storage system, the computer system coupled to receive the series of positions from the GPS receiver and coupled to receive a series of corresponding wind velocity measurements from the weather sensor and store the series of positions and the corresponding series of wind velocity measurements into the data storage system to create a record of the wind velocity with respect to the vehicle position.

2. The system of claim 1 further comprising:

a display coupled to the computer system, the display adapted to provide feedback to a user regarding the series of positions and the corresponding wind velocity measurements.

3. The system of claim 1 wherein the weather sensor is further adapted to measure temperature, and wherein a corresponding series of temperature measurements are stored into the data storage system to create the record.

4. The system of claim 1 wherein the weather sensor is further adapted to measure humidity, and wherein a corresponding series of humidity measurements are stored into the data storage system to create the record.

5. The system of claim 1 wherein the GPS receiver is a DGPS (differential GPS) receiver adapted to receive differential correction signals.

6. The system of claim 1 wherein the GPS receiver is an RTK (real-time kinematics) GPS receiver.

7. The system of claim 1 wherein the data storage system stores the record on a removable storage media.

8. A GPS weather data recording system for use with the dispensing of chemicals to agriculture fields while preventing excessive drift of the chemicals, comprising:

a GPS receiver adapted to determine a series of positions of a vehicle as the vehicle traverses an agricultural field;

a weather sensor for measuring wind velocity;

a data storage system for storing data measurements;

a computer system coupled to the data storage system, the computer system coupled to receive the series of positions from the GPS receiver and coupled to receive a series of corresponding wind velocity measurements from the weather sensor and store the series of positions and the corresponding series of wind velocity measurements into the data storage system to create a record of the wind velocity with respect to the vehicle position; and a display coupled to the computer system, the display adapted to provide feedback to a user regarding the series of positions and the corresponding wind velocity measurements.

9. The system of claim 8 wherein the weather sensor is further adapted to measure temperature, and wherein a corresponding series of temperature measurements are stored into the data storage system to create the record.

10. The system of claim 8 wherein the weather sensor is further adapted to measure humidity, and wherein a corresponding series of humidity measurements are stored into the data storage system to create the record.

11. The system of claim 8 wherein the GPS receiver is a DGPS (differential GPS) receiver adapted to receive differential correction signals.

12. The system of claim 8 wherein the GPS receiver is an RTK (real-time kinematics) GPS receiver.

13. The system of claim 8 wherein the data storage system stores the record on a removable storage media.

14. The system of claim 8 wherein the record is retrieved from the data storage system via a wireless transmission link.

15. The system of claim 8 further comprising an input output unit for receiving flow rate measurements describing the flow rate of the chemicals, and wherein a corresponding series of flow rate measurements are stored into the data storage system to create the record.

16. The system of claim 8 wherein the GPS receiver is further adapted to measure velocity of the vehicle, and wherein a corresponding series of vehicle velocity measurements are stored into the data storage system to create the record.

17. A GPS weather data recording method for the dispensing of chemicals to agriculture fields while preventing excessive drift of the chemicals, the method comprising the steps of:

determining a series of positions of a vehicle as the vehicle traverses an agricultural field using a GPS receiver;

measuring wind velocity using a weather sensor;

a data storage system for storing data measurements;

storing the series of positions and a corresponding series of wind velocity measurements into a data storage system to create a record of the wind velocity with respect to the vehicle position, wherein the operation of the GPS receiver, the data storage system, and the weather sensor is coordinated by a computer system; and providing feedback to a user regarding the series of positions and the corresponding wind velocity measurements using a display coupled to the computer system.

18. The method of claim 17 further including the steps of:

measuring temperature using the weather sensor to obtain a corresponding series of temperature measurements; and storing the corresponding series of temperature measurements into the data storage system to create the record.

19. The method of claim 17 further including the steps of:

measuring humidity using the weather sensor to obtain a corresponding series of humidity measurements; and storing the corresponding series of humidity measurements into the data storage system to create the record.

20. The method of claim 17 wherein the GPS receiver is a DGPS (differential GPS) receiver adapted to receive differential correction signals.

21. The method of claim 17 wherein the GPS receiver is an RTK (real-time kinematics) GPS receiver.

22. The method of claim 17 further comprising the step of storing the record on a removable media using the data storage system.

23. The method of claim 17 further comprising the step of retrieving the record from the data storage system using a wireless communications link.

24. The method of claim 17 further including the steps of:

measuring a flow rate of the chemicals as the chemicals are dispensed; and storing a corresponding series of flow rate measurements into the data storage system to create the record.

25. The method of claim 17 further including the step of printing a hard-copy of the data record using a printer coupled to the computer system.

26. A GPS weather data recording system for use with the dispensing of chemicals to agriculture fields, comprising:

a GPS receiver adapted to determine a series of positions of a vehicle as the vehicle traverses an agricultural field;

a weather sensor for recording a series of weather measurements;

a data storage; and a computer system coupled to the data storage system, the computer system coupled to receive the series of positions from the GPS receiver and coupled to receive the series of corresponding weather measurements from the weather sensor and store the series of positions and the corresponding series of weather measurements into the data storage system to create a record of the existent weather with respect to the vehicle position.

27. The system of claim 26 wherein the weather measurements comprise temperature, wind velocity, barometric pressure, or humidity.

28. The system of claim 27 wherein the data storage system stores the record on a removable storage media.

* * * * *